Aug. 28, 1928.

W. C. PALMER 1,682,412

METHOD AND APPARATUS FOR RADIUS GRINDING

Filed Feb. 6, 1926  5 Sheets-Sheet 2

INVENTOR
William C. Palmer
BY Evans and McCoy
ATTORNEYS

Aug. 28, 1928.

W. C. PALMER 1,682,412

METHOD AND APPARATUS FOR RADIUS GRINDING

Filed Feb. 6, 1926 5 Sheets-Sheet 4

INVENTOR
William C. Palmer
By Evans and McCoy
ATTORNEYS

Aug. 28, 1928.

W. C. PALMER

1,682,412

METHOD AND APPARATUS FOR RADIUS GRINDING

Filed Feb. 6, 1926    5 Sheets-Sheet 5

Inventor
William C. Palmer
By Evans and McCoy
Attorneys

Patented Aug. 28, 1928.

1,682,412

UNITED STATES PATENT OFFICE.

WILLIAM C. PALMER, OF DAVENPORT, IOWA, ASSIGNOR TO MICRO MACHINE COMPANY, OF BETTENDORF, IOWA, A CORPORATION OF IOWA.

METHOD AND APPARATUS FOR RADIUS GRINDING.

Application filed February 6, 1926. Serial No. 86,412.

This invention relates to grinding machines and to means for grinding true circular arcs. It more particularly relates to a relatively small and compact unit for use with a standard grinding machine to make possible the grinding of true circular arcs of long radii.

It is frequently desired, particularly in railroad work, to grind true circular arcs of long radii, for example, in the grinding of locomotive radius links, and link blocks for movement within such links. For economy in space and in investment in machinery a radius link grinding unit which may be used with a standard grinding machine is very desirable. It is furthermore desirable that such a unit be provided with a self-contained actuating mechanism so that complex adjustments with the actuating mechanism of a grinding machine are unnecessary and the accuracy of the arcuate surfaces being ground therefore greatly increased. Radius link grinding attachments heretofore provided for grinding true circular arcs have required large and cumbersome equipment therefor. It may be mentioned that it is very desirable that radius links and blocks should be formed with bearing surfaces of true circular arcs in order to provide the most efficient operation and longevity of the locomotive mechanism.

An object of my invention is to provide a relatively small, compact mechanism for grinding true circular arcs of long radii.

Another object of the invention is to provide a compact mechanism for use with a standard grinding machine for grinding arcuate surfaces.

A further object of this invention is to provide a compact radius link grinding unit for use with a grinding machine, said unit attachment having its own power mechanism for moving the work in an arcuate path with respect to the grinding wheel.

Another object of my invention is to provide a radius link grinding unit for grinding machines, said unit having means thereon for making accurate settings of long radii, and for compensating for the size of grinding wheel employed.

A further object of my invention is to provide a mechanism for grinding true circular arcuate surfaces, said mechanism having a large adjustable work support whereby a plurality of exactly duplicate concentric arcuate surfaces may be readily ground.

Another object of the invention is to provide a radius grinding unit for a grinding machine, said unit having means to move the work transversely of the grinding wheel spindle and means for automatically reversing said transverse motion.

A further object of this invention is to provide a compact mechanism for grinding true circular, arcuate surfaces in which the theoretical center of the arc is floating or movable.

Another object of the invention is to provide a compact means for grinding true circular arcuate surfaces in which the entire work support except the axis of pivotal movement thereof moves in a true circular arc about a moving theoretical center, the said axis of pivotal movement moving in a straight line.

Other objects of this invention will be apparent to those skilled in the art from the description of it hereinafter given.

I have shown in the drawings a mechanism adapted to be employed with a standard grinding machine. It will be understood, however, that mechanism embodying my invention may be embodied in an integral radius grinding machine.

Figure 1:
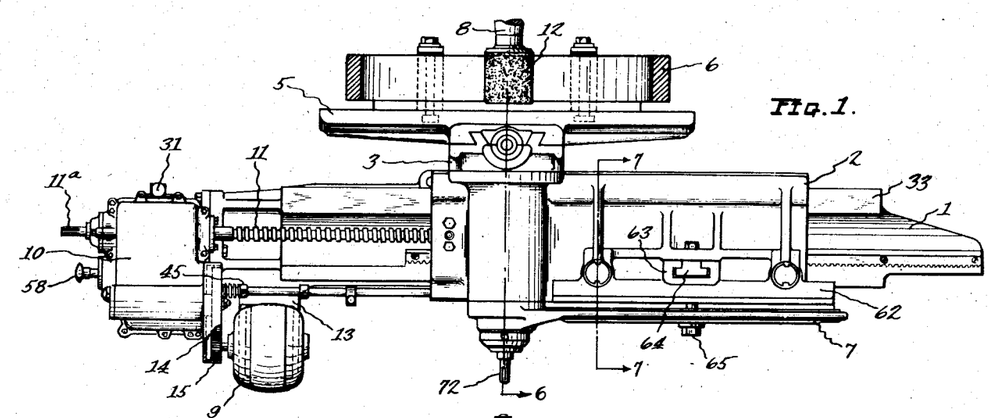
Figure 1 is a plan view of a radius grinding unit embodying my invention, a radius link to be ground being shown partly in section, and the grinding wheel and spindle being shown in operative relation to the said unit.
Figure 2:
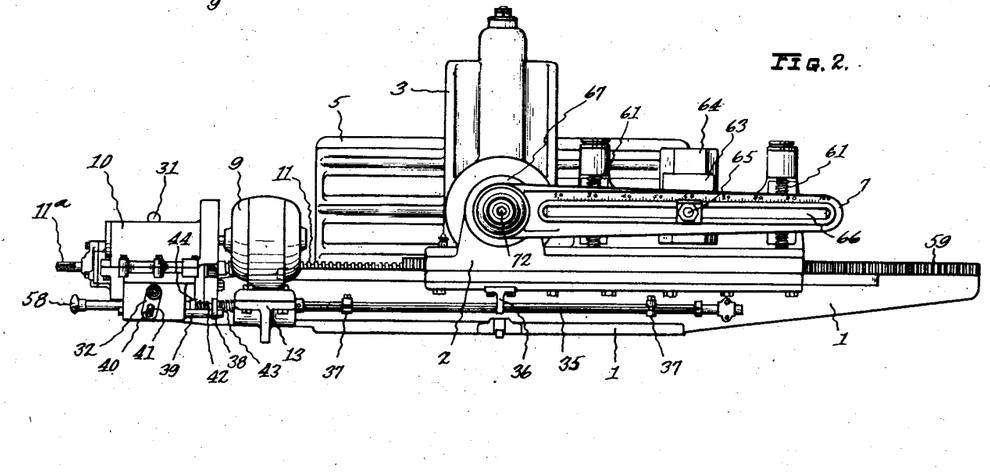
Fig. 2 is a rear elevation of the mechanism shown in Fig. 1.

My device is shown as comprising the base 1 which may be suitably secured to the reciprocable table of a standard grinding machine, such, for example, as shown in the reissued U. S. Letters Patent No. 16,043 to Joseph. In such a grinding machine, the table is preferably reciprocable longitudinally of the axis of the grinding wheel thereof. On the base 1 is mounted the slidable carriage 2, which, in turn, carries the hollow sleeve 67 in a trunnon bearing 4. Angular control plate 3 is disposed in fixed relation to the sleeve 67. Adjustably secured to and vertically movable with respect to the control plate 3 is the work support or mounting plate 5. Pivotal movement is transmitted to the work 6 mounted on the support 5 from the angular control lever 7 which is pivotally connected to the hollow sleeve 67, as will be more fully described hereinafter. In other words, the lever 7 is pivoted at the pivotal axis of the work support 5. The power for moving the carriage 2 transversely of the grinding wheel spindle 8 is obtained from the motor 9 and transmitted through gears in the gear case 10 to the screw 11 which drives the carriage 2. The work mounting plate 5 is given pivotal movement about the axis of the hollow sleeve 67 and trunnion bearing 4 through the pivotal movement of the angular control lever 7. The combination of the lateral and pivotal movement imparted to the mounting plate 5 moves the work 6 in such relation to the grinding wheel 12 as to generate a true circular arc of the desired radius. Thus, the pivotal axis of the work support 5 will travel in a plane which includes the axis of the grinding wheel 12, or, in other words, the axis of the grinding wheel 12 lies in the plane of travel of the pivotal axis of the work support 5.

It may be noted that the carriage 2 and the work 6 are shown as movable transversely of the grinding wheel spindle 8. Movement of the work 6 longitudinally of the grinding wheel spindle may be obtained by moving the grinding machine table on which the radius grinding unit is mounted, or by moving the grinding wheel spindle relative to the unit.

With the mechanism as shown, the carriage 2 may be moved longitudinally of the base 1 in either direction and at either of two speeds. Mechanism is also provided for automatically reversing the direction of longitudinal movement of the said carriage 2. The motor 9 which is mounted on a motor pad 13 transmits power to the drive gear 14 by gear 15 mounted on the shaft of the motor 9. The said drive gear 14 is mounted on shaft 16.

Figure 3:
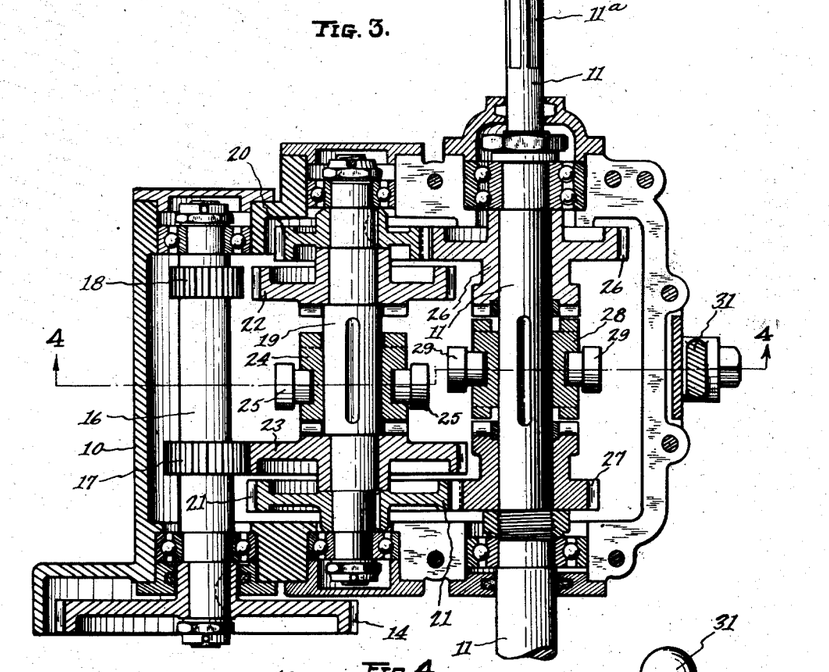
Fig. 3 is an enlarged sectional view of the gear case taken on the broken line 3—3 of Fig. 4.
Figure 4:
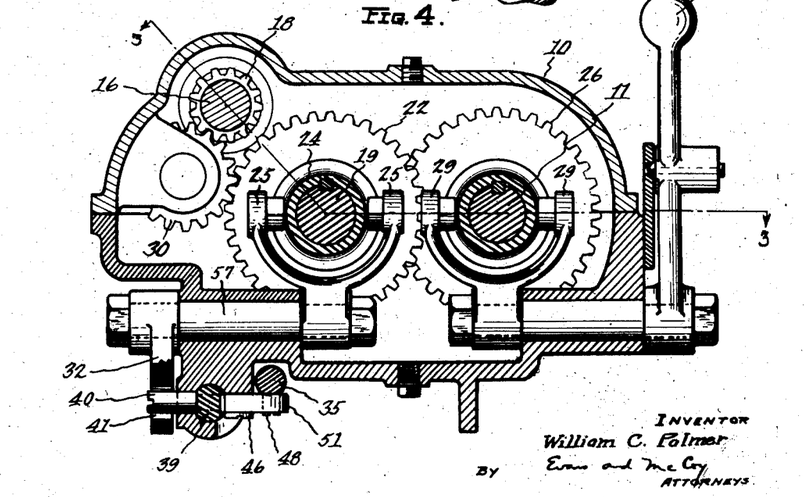
Fig. 4 is a vertical section on line 4—4 of Fig. 3.

In the gear case 10 the shaft 16 is provided with keyed gears 17 and 18. Intermediate shaft 19 is provided with keyed gears 20 and 21 and floating gears 22 and 23. Clutch collar 24 is adapted to engage with detents in either gears 22 or 23. The said clutch collar 24, which is keyed to shaft 19, is actuated by means of the clutch arms 25. Drive screw shaft 11 is provided with floating gears 26 and 27 and a clutch collar 28 longitudinally actuated by clutch arms 29. Clutch 24 is adapted to change the direction of rotation of drive screw 11 and clutch 28 is adapted to rotate said screw 11 at high or low speed.

Referring to Figs. 3 and 4, when the clutch 24 is in the position shown in Fig. 3 and the clutch 28 is engaged with the gear 27, the power will be transmitted from shaft 16 through gears 17, 23, 21 and 27 to shaft 11, which will be caused to rotate in the same direction as the shaft 16, and at high speed. With the clutch 28 engaging the gear 26 and the clutch 24 engaging the gear 23, the power will be transmitted from shaft 16 through gears 17, 23, 20 and 26 to the shaft 11, whereby the shaft 11 is caused to rotate in the same direction as shaft 16 but at low speed. When the clutch 24 engages with gear 22 the power will be transmitted from gear 18 to gear 22 by means of the idler gear 30 and the shaft 11 will be caused to rotate in a direction opposite to that of the shaft 16, and shaft 11 may be rotated at high or low speed as previously mentioned, depending on the position of the clutch 28. The clutch 28 is operated by hand by means of lever 31, as will readily be seen by reference to Figs. 3 and 4. Clutch 24 is operated automatically or by hand through the medium of lever 32 as will be more fully explained hereinafter.

By means of drive screw 11, therefore, the carriage 2 may be caused to move longitudinally of the base 1 in either direction and at high or low speed. The end 11ᵃ of the shaft 11 is suitably shaped so that the shaft 11 may be rotated by a hand crank if desired. In the transverse movement of the carriage 2 the surfaces 33 and 34 of the carriage slidably engage with the corresponding surfaces of the base 1.

Figure 5:
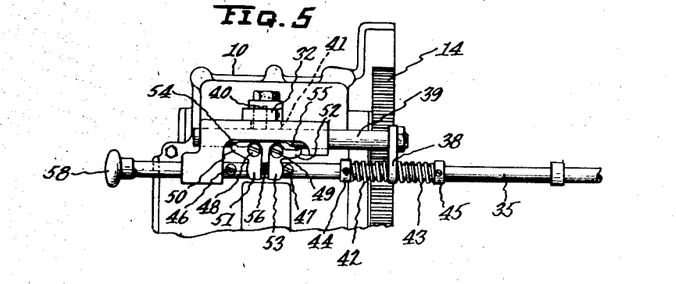
Fig. 5 is an enlarged fragmentary bottom plan view of the means for reversing the travel of the sliding carriage.

Means is provided for automatically reversing the direction of movement of the carriage 2 longitudinally of the base 1 after a predetermined length of travel. Thus the shaft 35 is slidably supported at the rear of the base 1. The arm 36 is attached to the carriage and is adapted to engage the adjustable collars 37 for reversing the direction of travel of the carriage, the collars 37 being spaced according to the travel of the carriage desired. Referring particularly to Fig. 5, slidably secured to the shaft 35 is a link 38 which is fixedly secured to the tripping plunger 39. A pin 40 extends transversely of the plunger 39 through aperture 41 in the lever 32, the pin 40 being adapted to move the lever 32 to thereby throw the clutch 24. Surrounding the shaft 35 on both sides of the link 38 are the compressible springs 42 and 43 which are fixed against translation along the shaft 35 by the adjustable collars 44 and 45. Also disposed on the shaft 35 are the stop pins 46 and 47. Mounted on the pins 48 and 49, which are affixed to the lower portion of the base 1, are pawls having the pawl arms 50 and 51, and 52 and 53, respectively. The arms 51 and 53 are ordinarily disposed between the pins 46 and 47 on the shaft 35. The arms 50 and 52 are adapted to engage in notches 54 and 55 in the tripping plunger 39. The distance between the grooves 54 and 55 is preferably less than the distance between the outer edges of the arms 50 and 52 when the said arms are in substantially aligned relation. The arms 50 and 52 are maintained in contact with the plunger 39 by a spring 56 disposed between the arms 51 and 53. The operation of the automatic reversing mechanism is as follows: Referring to Figs. 2 and 5, assume the arms 50 and 52 to be in the position as shown and that the carriage is traveling to the right. The arm 36 will engage the collar 37 and cause the shaft 35 to move to the right. This will compress spring 42 and bring the pin 46 adjacent to the pawl arm 51. When the shaft 35 has moved far enough to the right the pin 46 will engage the arm 51 and release the arm 50 from engagement with the plunger 39. On such release of the arm 50, the plunger 39 will be forced to the right due to the force imparted thereto by the release of the compressed spring 42. The movement of the plunger 39 will shift the clutch 24 through the medium of pin 40, lever 32, shaft 57 and clutch arms 25. When the plunger 39 is shifted, the pawl arm 52 will engage in the groove 55 and the reverse procedure will take place when the carriage 2 has come to the extreme left of its travel. A handle 58 is provided at the end of the shaft 35 so that the direction of travel of the carriage 2 may be reversed by hand when desired.

Figure 7:
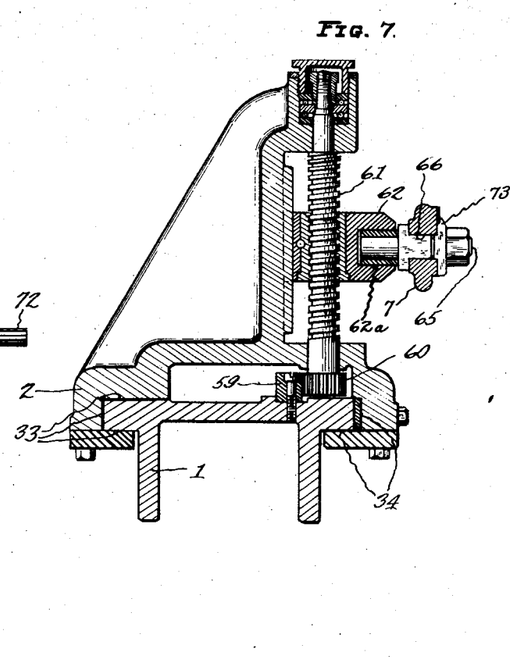
Fig. 7 is a vertical section on line 7—7 of Fig. 1.
Figure 8:
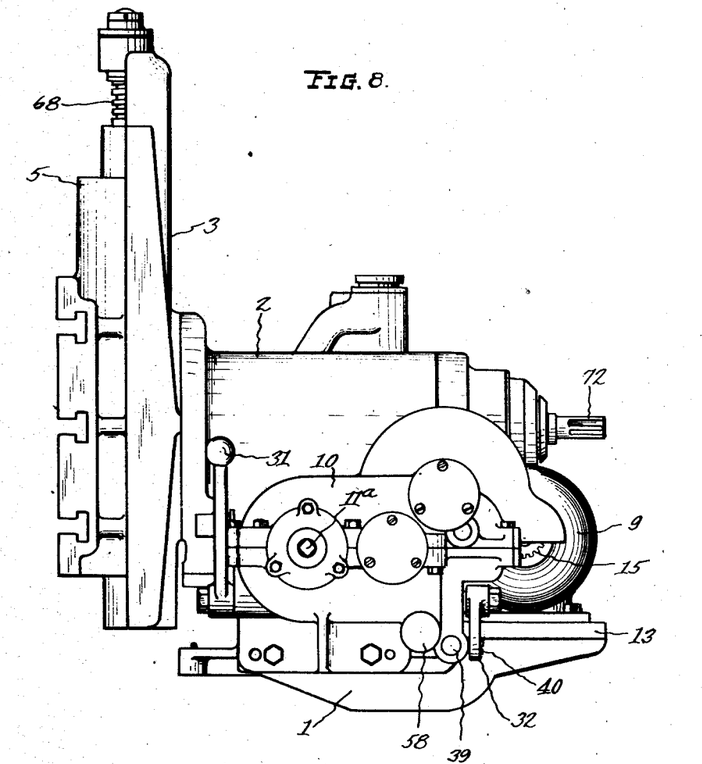
Fig. 8 is an end elevation of the radius grinding unit shewing the gear case in the foreground and the work supporting means at the left.
Figure 9:
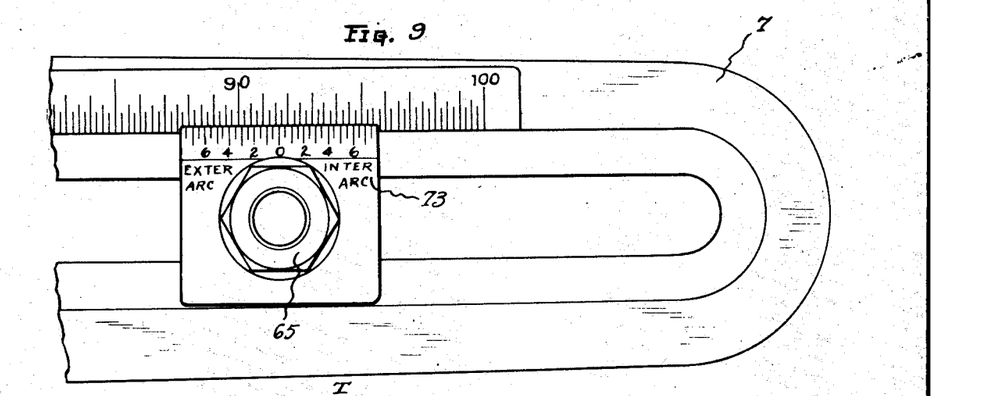
Fig. 9 is an enlarged elevation of a portion of the angular control lever showing the arc radius graduations thereof and showing a pivot stud with a cooperating member provided with graduations for correcting for the size of grinding wheel.

The pivotal movement of the work supporting means 5 and work 6 is dependent on and proportionate to the longitudinal travel of the carriage 2. Referring particularly to Figs. 2 and 7, attached to the base 1 is a rack 59 which engages with the pinions 60 and causes them to rotate when the carriage is in motion. Mounted on the carriage and in locked relation with the pinions 60 are the angular control screws 61. Cooperating with the screws 61 and movable vertically thereby is an angular control channel member 62 to which is attached a member 63 moving vertically in cooperative relation with a suitable slide 64. The lever arm 7 is thus movable about its pivotal axis by member 62 movable longitudinally in a plane perpendicular to the plane of travel of the pivotal axis of the work support 5. The channel member 62 is provided on one side thereof with a groove or channel 62$^a$ in which an adjustable pivot stud 65 is slidable. The stud 65 is adjustable in the slot 66 in the arm 7 which is graduated according to the desired radius of curvature of the surface to be ground. It will be noted that the said graduations are uniform and extend substantially throughout the length of the lever arm 7, and that therefore the scale of said graduations is relatively large, thus making it readily possible to obtain accurate settings of the stud 65. The stud 65 is set in fixed relation to the lever arm 7 at the desired radius, thereby determining the effective length of the lever arm 7. Associated with the pivot stud 65 is a member 73 graduated in such manner that allowance for the diameter of a grinding wheel 12 may be made in setting the stud 65 without the necessity for calculation. The member 73 will be further described hereinafter. Thus, a pivotal movement is imparted to the angular control lever 7 which in turn imparts a pivotal or angular motion to the hollow sleeve 67 and thereby to the work support 5 and the work 6. Pivotal motion of the support 5, therefore takes place in proportion to the longitudinal movement of the carriage 2. It will be noted that the pivotal movement of the work support is reversed simultaneously with the reverse of longitudinal travel of the carriage 2. Furthermore the radius of the resultant arcuate movement of the work support is dependent on the effective length of the lever arm 7 as determined by the position of the pivot stud 65. In this connection, the pivot stud 65 may be considered to define the outer effective end of the lever arm 7.

In my machine I have provided for a relatively great vertical adjustment of the work support 5 so that with one clamping of the work a plurality of concentric or duplicate surfaces may be ground accurately. By this means re-clamping of the work for two or more grindings is unnecessary, and hence no errors can arise therefrom. Thus I have provided a relatively long screw 68 mounted in suitable bearings and cooperatively associated with the threaded block 68$^a$ which is rigidly attached to the work support 5. Attached to one end of the screw 68 is a bevel gear 69 which is disposed in cooperating relation with the bevel gear 70 which, in turn, is affixed to the shaft 71 mounted in suitable bearings within the hollow sleeve 67. The shaft 71 may be rotated by hand by means of a crank disposed on the suitably shaped end 72, and the work support 5 thereby moved longitudinally with respect to the screw 68. Thus, if a plurality of concentric or duplicate arcuate surfaces are to be ground, the one or more pieces of work 6 may be clamped on the work support 5 and concentric or exactly duplicate arcuate surfaces ground consecutively merely by longitudinal adjustment of the work support with respect to the screw 68 to bring the particular surface to be ground in cooperative relation with the grinding wheel 12. The advantage of this feature will be readily appreciated when it is noted that thereby a link block and its corresponding link may be simultaneously clamped to the work support and all the cooperating arcuate surfaces ground to exactly the desired curvature.

Figure 6:
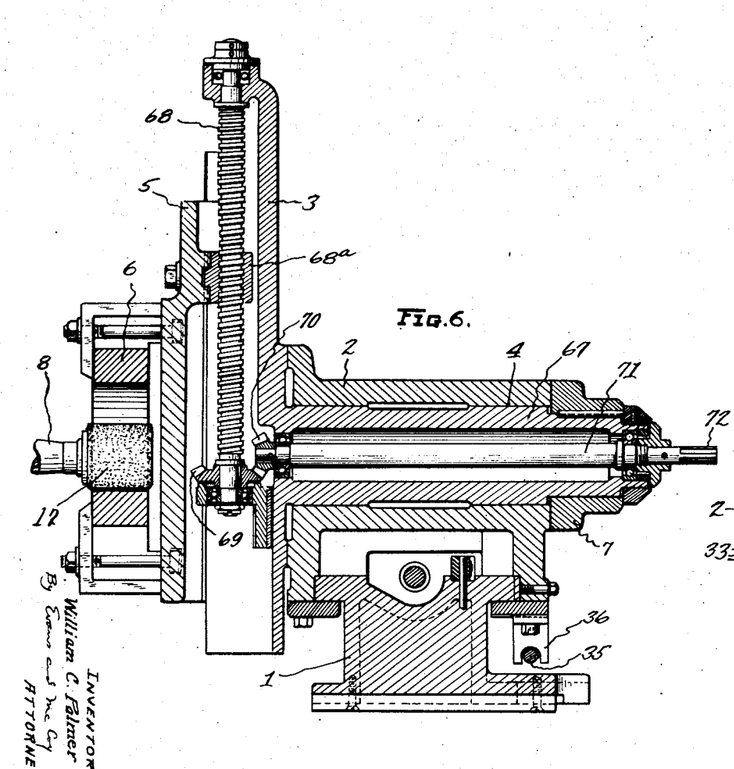
Fig. 6 is a vertical section on line 6—6 of Fig. 1.

In the present apparatus the diameter of the grinding wheel 12 is compensated for by suitably setting the stud 65 with respect to the graduations on the lever arm 7. Thus, as in grinding an external arc, if the grinding wheel is disposed above the surface to be ground, as indicated in Fig. 6, and if, for example, the diameter of the grinding wheel is two inches and the desired radius of the ground surface is 40 inches, the stud 65 would be set at a radius equal to the radius desired plus one-half the diameter of the grinding wheel, which in this case would be 40 plus 1, or 41 inches. If with the same dimensions as given the grinding wheel is disposed below the surface to be ground, as in grinding an internal arc, the setting will be made at the desired radius minus one-half the diameter of the grinding wheel. The above corrections are made due to the fact that the graduations on the angular control arm 7 refer to the center line of the grinding wheel and the grinding wheel spindle, so that said graduations may be universally applicable regardless of the size of grinding wheel used.

To more readily make allowance for the diameter of the grinding wheel in setting the pivot stud 65 at the proper diameter, I may provide the stud 65 with a graduated member 73, whereby such corrections may be made without calculation. The graduations of the member 73 may be read in terms of grinding wheel diameter in each direction from a central point, zero; thus, for example, if the grinding wheel is disposed above the surface to be ground in grinding an external arc, as indicated in Fig. 6, and if for example the diameter of the grinding wheel is 2 inches and the desired radius of the ground surface is 40 inches, the point 2 to the left of the zero on the graduated member 73 is disposed directly opposite the point 40 on the lever 7. If the grinding wheel were to be disposed below the surface to be ground as in grinding an internal arc, the point 2 to the right of the zero on the member 73 would be disposed opposite the point 40 on the lever 7.

In operation, the grinding wheel spindle 8 is, in one position of the carriage, in direct alignment with the center of the trunnion bearing 4, which center may be represented by the axis of the shaft 71. When the carriage is in longitudinal motion the axis of the shaft 71 and the point on the work support directly opposite said axis move in a straight line. Thus it may be said that during the operation of the mechanism, one and only one point on the work support moves in a straight line. Furthermore, the work supporting table 5 and the work 6 describe a true circular arc about a theoretical center which is floating or movable in a circular path with the axis of the grinding wheel as a center. The circular arc motion given to the work 6 is the result of the combination of the transverse movement of the carriage 2 and the pivotal movement of the angular control plate 3. It may be noted that the pivotal axis of the work support 5 as represented by the axis of shaft 71 remains in fixed lateral position relative to said work support 5 during the operation of the grinding machine.

Figure 10:
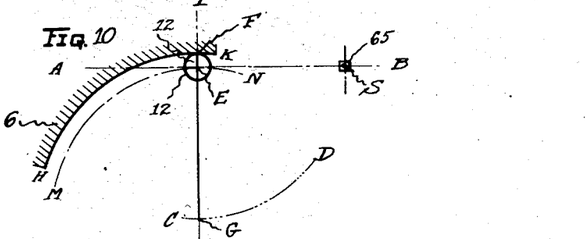
Fig. 10 is a diagrammatic view illustrating the operation of the grinding unit.
Figure 11:
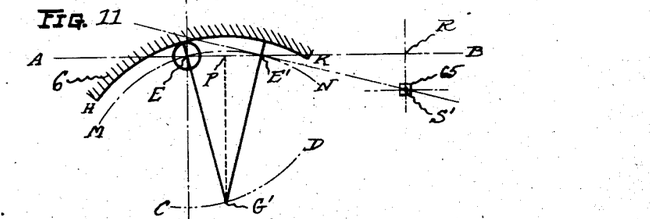
Fig. 11 is a diagrammatic view similar to that shown in Fig. 10 showing the unit in a second position.
Figure 12:
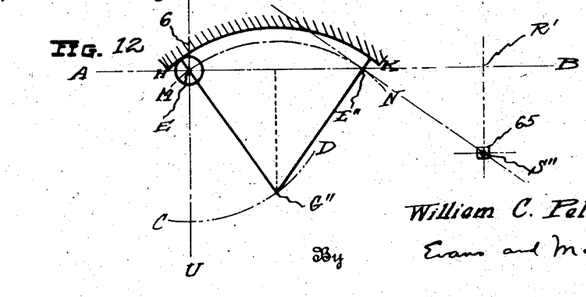
Fig. 12 is a diagrammatic view similar to that shown in Fig. 11, showing the unit in a third position.

The operation of my improved grinding unit and the fact that a true circular arc is to be ground will be more readily understood by reference to Figs. 10, 11 and 12, in which three positions of a unit are diagrammatically represented. In Fig. 10, E represents the pivotal axis of the work support 5 which in the drawings is in alignment with the axis of the shaft 71 and hollow sleeve 67.

The line AB represents the path along which the point E moves during the operation of the grinding unit. The center of the grinding wheel is shown in alignment with the center of pivotal movement of the work support 5 and therefore coincides with the point E. S represents the position of the pivot stud 65 which in Fig. 10 is disposed on the line AB, the length of the angular control lever being represented by the distance ES. The work 6 to be ground is shown in cooperative relation to the grinding wheel, F being the point of tangency between the grinding wheel 12 and the work 6. The theoretical center of the arc HK to be ground is shown in Fig. 10 at G, FG being the radius of the arc to be ground. Arc MN is concentric with HK, the true circular arc to be ground, and passes through the axis of the grinding wheel G is shown in Fig. 10 as being disposed on the vertical center line TU of the grinding wheel and also on the circular arc CD, whose center is at E; it can be mathematically shown that the path of the theoretical center of the arc to be ground is along circular arc CD, whose center is at E and whose radius is equal to the distance EG. In Figs. 10, 11 and 12, ES is shown as equal to GE.

In Fig. 11 the carriage 2 is shown as having traversed a horizontal distance equal to EE', the pivotal axis of said carriage assuming the new position E'. The point S of Fig. 10 is shown as having traversed a vertical distance RS' to assume new position S'. The length of the angular control lever is therefore indicated by the distance E'S'. The theoretical center of the arc to be ground has moved to the point G' on the arc CD. The arc MN is tangent to the line E'S' at E'. The arc EE' and the chord EE' are therefore included between the radii EG' and G'E'. The line PG' is a bisector of the chord EE'. Mathematically, angle EG'P is equal to the angle PG'E' is equal to the angle RE'S'.

Since the triangle G'PE' and E'RS' are similar, as can be mathematically proved, and in the present case equal, the ratio of VT, the vertical travel of the pivot stud 65, represented by RS' in Fig. 11, to L, the effective length of the lever arm 7, represented by E'S' in Fig. 11, is equal to the ratio of one-half HT, the horizontal travel of the trunnion center, represented by EE' in Fig. 11, to R, represented by the radius G'E', and, by transposition, $$R = \frac{1/2 HT}{VT} \times L$$

In Figs. 10, 11 and 12 the expression $$\frac{1/2 HT}{VT}$$

is equal to 1, whereas in the grinding unit shown in Figs. 1 to 9 inclusive this ratio is shown as equaling 4 in order to make the lever arm relatively short and to permit of the construction of a relatively compact machine. This ratio, however, can be made of any suitable value according to the size of complete unit desired. In the drawings it can also be mathematically proved that VT, the vertical travel of the pivot stud 65, is proportional to the sine of the angle PG'E'. This relation is true whatever the value of the ratio $$\frac{1/2 HT}{VT}$$

may be taken to be. In operation, therefore, at successive positions of the pivot stud 65, the vertical travel of the said stud and of the portion of the lever arm 7 cooperating therewith, will be proportional to the sine of half the angle included between the theoretical center of the arc being ground and the pivotal axis of the work support 6 at corresponding successive positions thereof. If the amount of horizontal travel of the carriage 2, namely HT, be doubled, the value of the sine of the angle PG'E' also becomes doubled, but the number of degrees of said angle is actually more than doubled. For this reason, if the angular movement of the work support were to be obtained by gears, a true circular arc could never be ground, because the work support when moved angularly by gears must move in proportion to the increase in the number of degrees in the above-mentioned angle and not in proportion to the change in the sine thereof.

Moreover, with angular rotation by gearing, as the length of arc being ground is increased, the variation of said arc from a circular shape is increased, since there is an increasingly greater variation between the sine of the above-mentioned angle and the value of the angle.

In my grinding mechanism, since the ratio of HT, the horizontal travel of the carriage, to VT, the vertical travel of the pivot stud is held constant during a grinding operation, the formula for R, the radius from the theoretical center of the arc being ground to the axis of the grinding wheel, may be applied at any point of the travel, such as third position of the carriage and pivot stud shown in Fig. 12 where the horizontal travel of the carriage is represented by the distance E'' and where the vertical travel of the pivot stud is represented by R'S'', the theoretical center of the arc being ground being shown at G''.

It will be noted that I have provided a short and compact mechanism for grinding true arcs of long radii, which mechanism is adapted to be employed with a standard grinding machine.

It will be further noted that since my improved grinding machine unit has its own power mechanism for movement transversely of a grinding machine, it need not therefore be accurately aligned with transverse moving mechanism of a grinding machine. It will also be noted that I have provided a grinding unit having its own automatic reversing mechanism.

It will thus be seen that I have provided a method whereby the opposed sides of a link, link block or similar article may be ground concentrically to arcs of true circular shape, and whereby corresponding arcuate surfaces, as of a link and link block, may be ground to the proper curvature.

It will also be seen that I have provided a work support having a relatively great working adjustment so that a plurality of surfaces which are intended to work in cooperating relation may be ground with one clamping of the work, thereby insuring uniformly ground cooperating surfaces.

To those skilled in the art many modifications of, and widely differing embodiments and applications of my invention will suggest themselves, without departing from the spirit and scope thereof. My disclosures and the descriptions herein are purely illustrative and are not intended to be in any sense limiting.

What I claim is:

1. In radius grinding mechanism adapted to cooperate with a rotatable grinding wheel, in combination, a base, a carriage mounted for longitudinal movement on said base, a work support pivotally mounted on said carriage so that the pivotal axis of said work support will remain in fixed lateral position relative to said work support and will travel in a true plane which includes the axis of said grinding wheel, means to cause longitudinal travel of the carriage on said base, and means for moving said work support about the pivotal axis thereof during the longitudinal movement of the carriage.

2. In radius grinding mechanism adapted to cooperate with a rotatable grinding wheel, in combination, a base, a carriage mounted for longitudinal movement on said base, a work support provided with a lever arm of predetermined length, said work support being pivotally mounted on said carriage so that the pivotal axis of said work support will travel in a plane which includes the axis of said grinding wheel and in which plane at one point of said travel said pivotal axis is in longitudinal alignment with the grinding wheel axis, means to cause longitudinal travel of the carriage on said base, and means engaging said lever arm to move the outer effective end thereof, said means moving simultaneously with the longitudinal travel of said carriage only in directions perpendicular to the plane of travel of said work support at such a rate that the travel of said effective end of said lever arm at successive positions thereof, measured in said perpendicular directions, will be proportional to the sine of half the angle included between the theoretical center of the arc being ground and the pivotal axis of the work support at corresponding successive positions thereof.

3. A radius grinding unit adapted to be disposed on the table of a grinding machine comprising, in combination, a base adapted to be disposed on the table of said grinding machine, a carriage mounted for movement longitudinally of said base and transversely of the axis of the grinding wheel of said machine, a work support pivotally mounted on said carriage so that the pivotal axis of said work support will remain in fixed lateral position relative to said work support and will travel in a true plane which includes the axis of said grinding wheel, means carried by the base to cause longitudinal travel of the carriage on said base, means carried by the base for moving said work support about the pivotal axis thereof simultaneously with the longitudinal movement of the carriage, and means to reverse the direction of longitudinal travel of said carriage and of the pivotal movement of said work support.

4. A radius grinding unit adapted to be disposed on the table of a grinding machine comprising, in combination, a base adapted to be disposed on the table of said grinding machine, a carriage mounted for movement longitudinally of said base and transversely of the axis of the grinding wheel of said machine, a work support pivotally mounted on said carriage so that the pivotal axis of said work support will remain in fixed lateral position relative to said work support and will travel in a plane which includes the axis of said grinding wheel, means for adjusting said work support vertically to a relatively great degree with respect to the grinding wheel and to said axis, a motor mounted on said base, means driven by said motor to cause longitudinal travel of the carriage on said base at one of a plurality of speeds, means driven by said motor for moving said work support about the pivotal axis thereof simultaneously with the longitudinal movement of the carriage, and means to automatically and simultaneously reverse the direction of longitudinal travel of said carriage and of the pivotal movement of said work support.

5. A radius grinding unit adapted to be mounted on a grinding machine table in cooperative relation to a grinding wheel and grinding wheel spindle, and means to cause reciprocative movement between said grinding wheel and table longitudinally of said grinding wheel spindle comprising, in combination, a base adapted to be disposed on the table of said grinding machine, a carriage mounted for movement longitudinally of said base and transversely of the axis of the grinding wheel of said machine, a work support pivotally mounted on said carriage so that the pivotal axis of said work support will remain in fixed lateral position relative to said work support and will travel in a plane which includes the axis of said grinding wheel, means carried by the base to cause longitudinal travel of the carriage on said base, means carried by the base for moving said work support about the pivotal axis thereof simultaneously with the longitudinal movement of the carriage, means to automatically and simultaneously reverse the direction of longitudinal travel of said carriage and of the pivotal movement of said work support, and means on the grinding machine to automatically reverse the direction of said reciprocative movement between the grinding wheel and table.

6. In radius grinding mechanism adapted to cooperate with a rotatable grinding wheel, in combination, a base, a carriage mounted for longitudinal movement on said base, a work support pivotally mounted on said carriage so that the pivotal axis of said work support will travel in a plane which includes the axis of said grinding wheel, means for moving said work support about the pivotal axis thereof during the longitudinal movement of the carriage including a graduated lever arm pivoted at the pivotal axis of said work support, means for moving said work support about its pivotal axis by means of said lever arm including a member movable longitudinally in a plane perpendicular to the plane of travel of the pivotal axis of said work support, an adjustable pivot stud cooperable with said graduated lever and said longitudinally moving member fixedly disposable with respect to said lever arm and freely slidable in a direction perpendicular to the direction of movement of said longitudinally moving member, whereby said work support may be pivotally moved through a lever arm of constant length but at a distance of varying length perpendicular to the direction of movement of said member.

7. In radius grinding mechanism adapted to cooperate with a rotatable grinding wheel, in combination, a base, a carriage mounted on said base for movement longitudinally of said base and transversely of the axis of said grinding wheel, a work support pivotally mounted on said carriage so that the pivotal axis of said work support will travel in a plane which includes the axis of said grinding wheel, means for moving said work support about its pivotal axis during the longitudinal movement of the carriage including a graduated lever arm pivoted at the pivotal axis of said work support, a member movable only in a plane perpendicular to the plane of travel of the pivotal axis of said work support, means to actuate said member during the longitudinal movement of said carriage, and means to transmit said movement from said member to said lever arm comprising a stud adjustable to provide a lever arm of predetermined length, said stud being slidable with respect to said member in a direction perpendicular to the direction of movement of said member.

8. In radius grinding mechanism, in combination with a rotatable grinding wheel, a base, a carriage mounted on said base for movement longitudinally of said base and transversely of the axis of said grinding wheel, a work support pivotally mounted on said carriage so that the pivotal axis of said work support will travel in a plane which includes the axis of said grinding wheel, means for moving said work support about its pivotal axis during the longitudinal movement of the carriage including a graduated lever arm pivoted at the pivotal axis of said work support, a slotted member movable only in a plane perpendicular to the plane of travel of the pivotal axis of said work support, means to move said slotted member by means carried by the carriage during the longitudinal movement of said carriage, and means to transmit said movement from said member to said lever arm comprising a stud adjustable to provide a lever arm of predetermined length, said stud being slidable with respect to said member in a direction perpendicular to the direction of movement of said member.

9. In radius grinding mechanism adapted to cooperate with a rotatable grinding wheel, in combination, a base adapted to be positioned on a support, a carriage mounted for movement on said base, longitudinally of said base and transversely of the axis of said grinding wheel, a work support pivotally mounted on said carriage so that the pivotal axis of said work support will remain in fixed lateral position relative to said work support and will travel in a plane which includes the axis of said grinding wheel, whereby the work may be moved transversely and pivotally with respect to said grinding wheel, and means carried by said carriage whereby said work support may be moved to a relatively great extent in a plane perpendicular to the axis of said grinding wheel and to the pivotal axis of the work support, whereby a plurality of surfaces of desired radius may be readily ground with the same mounting of the work.

10. In radius grinding mechanism adapted to cooperate with a rotatable grinding wheel, in combination, a base adapted to be positioned on a support, a carriage mounted for movement on said base, longitudinally of said base and transversely of the axis of said grinding wheel, a work support pivotally mounted on said carriage so that the pivotal axis of said work support will travel in a plane which includes the axis of said grinding wheel, means for pivotally moving said work support including a lever arm pivoted at the pivotal axis of said work support, linear uniform graduations of large scale on said lever arm extending throughout the range of radii of arcs to be ground, and means for actuating said lever including a pivot stud adapted to be set at the point of graduation indicating the desired radius, the scale of said graduations being sufficiently large so that the stud may be readily and accurately set at the desired radius.

11. In radius grinding mechanism adapted to cooperate with a rotatable grinding wheel, in combination, a base adapted to be positioned on a support, a carriage mounted for movement on said base, longitudinally of said base and transversely of the axis of said grinding wheel, a work support pivotally mounted on said carriage so that the pivotal axis of said work support will travel in a plane which includes the axis of said grinding wheel, means for moving said work support about its pivotal axis including a lever arm pivoted at the pivotal axis of said work support, linear uniform graduations of large scale on said lever arm extending throughout the range of radii of arcs to be ground, means for actuating said lever including a pivot stud adapted to be set at the point of graduation indicating the desired radius, and means for compensating for the diameter of the grinding wheel, whether grinding internal or external arcs, said compensating means including a portion cooperatively associated and movable with said pivot stud and provided with graduations in terms of grinding wheel dimensions, whereby said stud may be set with respect to the lever with the dimension of the desired grinding wheel directly opposite the radius of the arc to be ground, thereby eliminating the necessity for computing an allowance for the dimension of the grinding wheel.

12. The method of grinding true circular arcuate surfaces of long radii, which comprises, disposing the work to be ground adjacent a grinding wheel on a pivotally mounted work support, rotating said grinding wheel, causing said work support to travel bodily transversely of the axis of said grinding wheel so that the pivotal axis of said work support will remain in fixed lateral position relative to said work support and will travel in a plane which includes the axis of said grinding wheel, and moving said work support about the pivotal axis thereof simultaneously with the transverse movement of said work support, whereby to cause the work mounted on said work support to present to the grinding wheel a true circular arcuate surface to be ground.

13. The method of grinding true circular arcuate surfaces of long radii, which comprises, disposing the work to be ground adjacent a grinding wheel on a pivotally mounted work support provided with a lever arm of predetermined length, rotating said grinding wheel, causing said work support to travel bodily transversely of the axis of said grinding wheel so that the pivotal axis of said work support will travel in a plane which includes the axis of said grinding wheel, and in which plane, at one point of said travel, said pivotal axis is in longitudinal alignment with the grinding wheel axis, moving said work support about the pivotal axis thereof simultaneously with the transverse movement of said work support by moving the outer end of said lever arm by means moving only in directions perpendicular to said plane of travel of the work support at such a rate that the travel of the end of said lever arm at successive positions thereof, measured in said perpendicular directions, will be proportional to the sine of half the angle included between the theoretical center of the arc being ground and the pivotal axis of the work support at corresponding successive positions thereof.

14. The method of grinding true circular arcuate surfaces of long radii, which comprises, disposing the work to be ground adjacent a grinding wheel on a pivotally mounted work support provided with a lever arm of predetermined length, rotating said grinding wheel, causing said work support to travel bodily transversely of the axis of said grinding wheel so that the pivotal axis of said work support will travel in a true plane which includes the axis of said grinding wheel, pivotally moving said work support about the pivotal axis thereof simultaneously with the transverse movement of said work support by applying force to the effective outer end of said lever arm, only in directions perpendicular to the lever arm at one position thereof, whereby the distance parallel to said lever arm at said position from the pivotal axis of said lever to the point of application of said force is continuously varied and whereby to cause the work mounted on the work support to present to the grinding wheel a true circular arcuate surface to be ground.

In testimony whereof I affix my signature.

WILLIAM C. PALMER.